United States Patent [19]
Okabe et al.

[11] Patent Number: 4,798,563
[45] Date of Patent: Jan. 17, 1989

[54] SELF-CONTAINED TYPE AUTOMATIC BELT TENSIONER

[75] Inventors: Yoshio Okabe, Chiryu; Yukimori Kobayashi, Gamagori; Makoto Ishikawa, Mishima; Tamotsu Kamiya, Susono; Tomiaki Atsumi, Toyota, all of Japan

[73] Assignees: Aisin Seiki Kabushiki Kaisha, Kariya; Toyota Jidosha Kabushiki Kaisha, Toyota, both of Japan

[21] Appl. No.: 130,180

[22] Filed: Dec. 8, 1987

[30] Foreign Application Priority Data

Dec. 8, 1986 [JP] Japan ................... 61-290457

[51] Int. Cl.$^4$ .............................. F16H 7/08
[52] U.S. Cl. ..................... 474/110; 474/138
[58] Field of Search ............ 474/101, 103, 109–111, 474/133, 135, 136, 138; 267/124, 129

[56] References Cited

U.S. PATENT DOCUMENTS 4,539,001  9/1985  Okabe ...................... 474/110 X
4,674,996  6/1987  Anno et al. ................ 474/110
4,708,696 11/1987  Kimura et al. .............. 474/103

FOREIGN PATENT DOCUMENTS 59-126144  7/1984  Japan .

Primary Examiner—Thuy M. Bui
Attorney, Agent, or Firm—Oblon, Fisher, Spivak, McClelland & Maier

[57] ABSTRACT

A self-contained type automatic belt tensioner adjusts a tension of an engine timing belt for automobiles. The tensioner comprises a body, a plunger slidably mounted in the body, a reservoir chamber located in the plunger, a pressure chamber disposed between the plunger and a closed wall of the body, a rod member fixed to the plunger, a bellows shaped elastic diaphragm located in the reservoir chamber with one end thereof being fixed to the rod member and the other end being fixed to the body, a check valve allowing a fluid flow only from the reservoir chamber to the pressure chamber, and a return spring interposed between the plunger and the closed wall of the body so as to bias said plunger in the direction of the rod member.

7 Claims, 2 Drawing Sheets

SELF-CONTAINED TYPE AUTOMATIC BELT TENSIONER

BACKGROUND OF THE INVENTION

1. Field of the Invention

This invention relates to automatic belt tensioner for adjusting the tension of an engine timing belt in apparatus such as automobiles, and more particularly to automatic belt tensioners of the self-contained type in which a fluid is sealed within the assembly without provision for its replacement from any external source during operation.

2. Description of the Prior Art

Various types of automatic belt tensioners for preventing the slackening of an engine timing belt for automobiles have been proposed. One example of a prior art automobile belt tensioner is disclosed in the Japanese patent application laid-open publication No. 59(1984)-126144 as shown in FIG. 4 attached hereto. In FIG. 4, an automatic belt tensioner comprises a body 1 in which a plunger 2 is slidably mounted so as to form a large diameter oil chamber 4 in which a fluid is sealed by means of a seal member 3. The plunger 2 is continuously biased in the direction of the oil chamber 4 by a spring 7 interposed between a snap ring 5 and a stepped portion 6 of the plunger 2.

The plunger 2 is provided with a hole 8 in which a piston 9 is slidably disposed so as to form a small diameter oil chamber 11 communicating with the large diameter oil chamber 4 through a small diameter passage 10. The small diameter oil chamber 11 is sealed from the outside by means of a seal member 12. Secured to an open portion of the hole 8 is a snap ring 13 which may come into contact with a stepped portion 14 of the piston 9 in order to prevent the piston 9 from coming out. A head portion 9a of the piston 9 protrudes outwardly from the body 1. An end surface 9b functions as a pushing surface of the automatic belt tensioner.

When an engine temperature rises from a normal temperature to a high temperature, a thermal expansion is generated between a cam and a crank whereby the tension of a belt a shown in FIG. 3 is increased. At this time, since the load applied to the piston 9 is increased, the inner oil pressure of the small diameter oil chamber 11 is also increased. Therefore, the oil flows from the small diameter oil chamber 1 into the large diameter oil chamber 4 through a small diameter passage 10, with the result that the piston 9 is moved downward in the side of the body 1 and that the increase of the belt tension is absorbed. In FIG. 3 showing a general automatic belt tensioner, an automatic belt tensioner C installed in a bracket b pushes the belt a through an idler pulley d.

On the contrary, when the engine temperature falls from the high temperature to the normal temperature, the tension of the belt is decreased whereby the load applied to the piston 9 is decreased. Therefore, due to the inner oil pressure of the small diameter oil chamber 11, the piston 9 will protrude from the body 1 and push the belt, whereby the decrease amount of the belt tension can be absorbed. Thus, an appropriate tension of the belt can be maintained.

In the above prior art automatic belt tensioner, however, the piston receives the load of the belt and faces at the bottom end thereof the small diameter oil chamber 11. When the piston 9 is pushed down, a high oil pressure is generated in the small diameter oil chamber 11. Since the high oil pressure acts on the seal member 12 through a gap between the piston 9 and the plunger 2, a bad influence is produced that the seal member 12 is deformed. Furthermore, the high oil pressure in the small diameter oil chamber 11 is transmitted to the large diameter oil chamber 4 through the small diameter passage 10. Since the large diameter oil chamber 4 receives the biasing force of the spring 7, the high oil pressure in the large diameter oil chamber 4 has a bad influence on the seal member 3 through the gap between the plunger 2 and the body 1. Therefore, the sealing function of the seal members 3 and 12 will be deteriorated and the oil will leak out of the seal members 3 and 12.

SUMMARY OF THE INVENTION

Accordingly, it is an object of the present invention to eliminate the drawbacks of the prior art automatic belt tensioner.

Another object of the present invention is to provide a new and improved self-contained type automatic belt tensioner.

Still another object of the present invention is to provide a self-contained type automatic belt tensioner in which the sealing function of a seal member is improved.

In one illustrative embodiment of the present invention, there is provided a self-contained type automatic belt tensioner which includes a body having an axially extending blind bore therein with an opening at one end and a closed wall at the other end, a plunger slidably mounted in the blind bore of the body, a reservoir chamber located in the plunger, a pressure chamber disposed between the plunger and the closed wall of the body, a rod member fixed at one end thereof to the plunger and protruding at the other end thereof from the opening of the body, a bellows shaped elastic diaphragm located in the reservoir chamber with one end thereof being fixed to the rod member and the other end being fixed to the body, a fluid passage connecting the reservoir chamber and the pressure chamber with each other, a check valve disposed in the fluid passage so as to allow a fluid flow only from the reservoir chamber to the pressure chamber, and a return spring interposed between the plunger and the closed wall of the body so as to bias the plunger in the direction of the opening of the body.

The foregoing and other objects, features and advantages of the present invention will be apparent from the following description of a preferred embodiment with reference to the attached drawings.

DESCRIPTION OF THE PREFERRED EMBODIMENT

Figure 2:
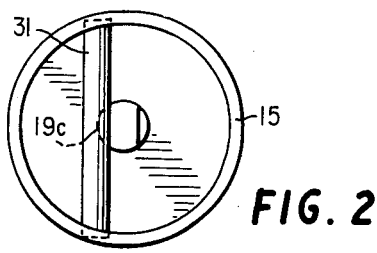
FIG. 2 is a plan view of the automatic belt tensioner of FIG. 1.
Figure 1:
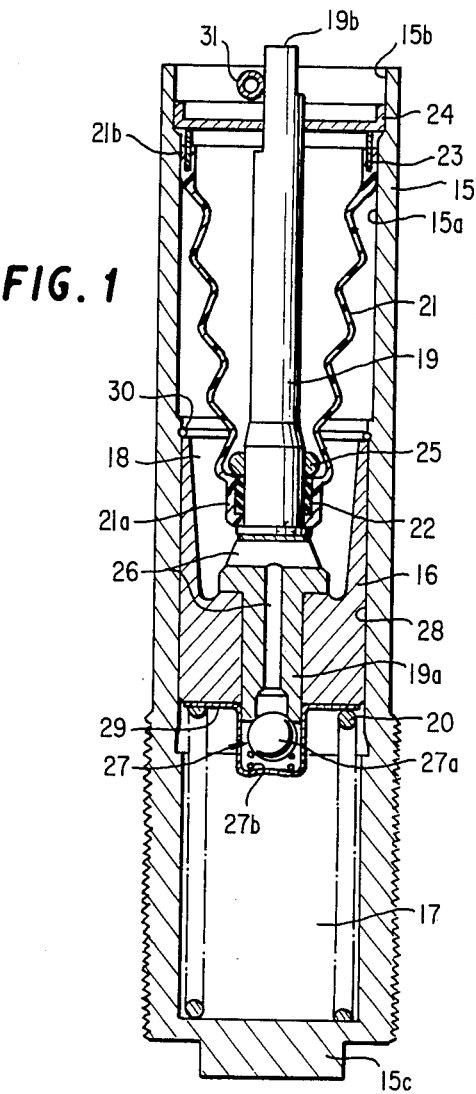
FIG. 1 is a vertical sectional view of a self-contained type automatic belt tensioner constructed in accordance with one illustrative embodiment of the invention.
Figure 3:
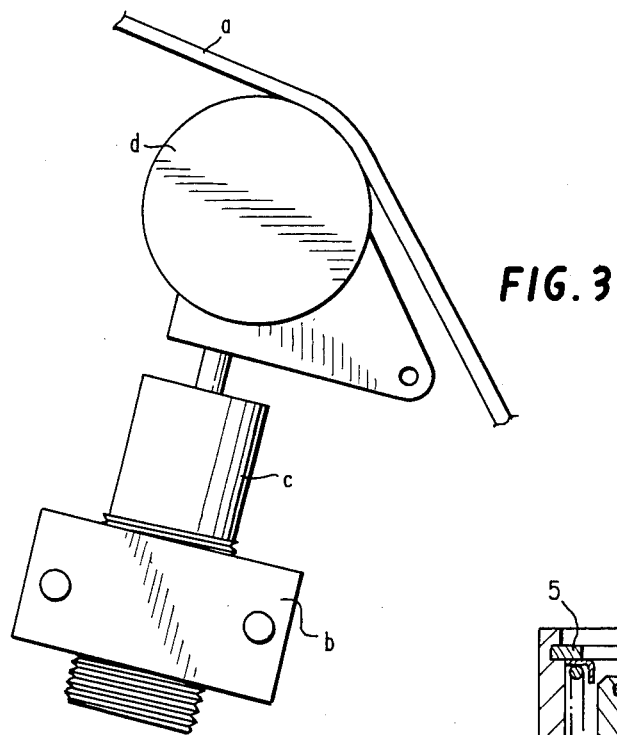
FIG. 3 is a front view showing an engagement condition between an automatic belt tensioner and a belt.
Figure 4:
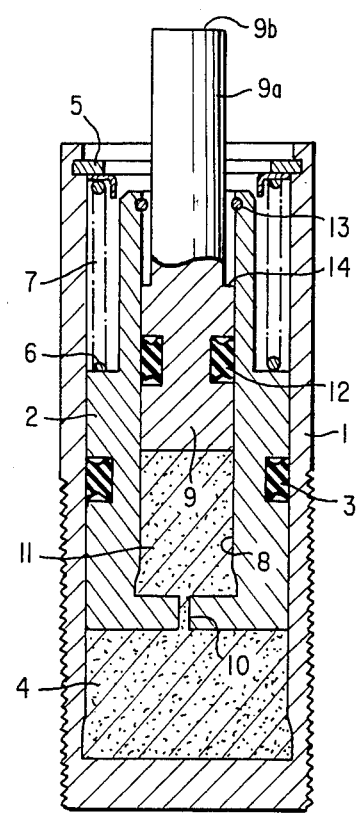
FIG. 4 is a vertical sectional view of a prior art automatic belt tensioner.

Referring now to FIG. 1 and FIG. 2, a self-contained type automatic belt tensioner includes a cylindrical body 15 which has an axially extending blind bore 15a therein with an opening 15b at one end and a closed wall 15c at the other end. Slidably mounted in the blind bore 15a of the body 15 is a plunger 16 in which a reservoir chamber 18 is located. A pressure chamber 17 is disposed between the plunger 16 and the closed wall 15c of the body 15. A rod member 19 is mounted at one end 19a thereof to the plunger 16 and protrudes at the other end 19b from the opening 15b of the body 15 so as to push the belt a (shown in FIG. 3) through the idler pulley d. A return spring 20 is interposed between the plunger 16 and the closed wall 15c of the body 15 so as to bias the plunger 16 in the direction of the opening 15b of the body 15. Located in the reservoir chamber 18 is a bellows shaped elastic diaphragm 21, a lower end 21a of which is fixed to the rod member 19 through a seal member 22 and an upper end 21b of which is fixed to an inner circumferential surface of the body 15 through a seal member 23. The volume change of the reservoir chamber 18, which increases and decreases according to the upward and downward movement of the plunger 16, can be absorbed by the diaphragm 21 which can expand and contract in response to the movement of the plunger 16. the upper end 21b of the diaphragm 21 is prevented from moving upwardly by a stopper 24 secured to the inner circumferential surface of the body 15, while the lower end 21a is prevented from moving upwardly by a stopper 25 secured to the rod member 19. The rod member is provided with a fluid passage 26 through which the reservoir chamber 18 and the pressure chamber 17 are connected with each other. Disposed in the fluid passage 26 is a check valve 27 which allows a fluid flow only from the reservoir chamber 18 to the pressure chamber 17. the check valve 27 comprises a ball 27a and a spring 27b which continuously biases the ball 27a to its closed position. The spring 27b is supported by a retainer 29. An upward movement of the plunger 16 biased by the spring 20 is limited by a snap ring 30 functioning as a stopper. A rotation stopper member 31 is fixed at both ends thereof to the body 15 and is engaged with a recess 19c of the rod member 19, thereby preventing the rod member 19 from rotating.

In operation, when an engine temperature rises from a normal temperature to a high temperature, a thermal expansion is generated between a cam and a crank, with the result that a tension of a belt is increased. Therefore, the load applied to the plunger 16 through the rod member 19 is increased, and accordingly an oil pressure in the pressure chamber 17 will rise. As a result, the oil in the pressure chamber 17 flows from the pressure chamber 17 to the reservoir chamber 18 through a leak clearance 28 between the body 15 and the plunger 16, whereby the plunger 16 will be moved downwardly, namely in the direction of the pressure chamber 17, according to the decreased volume of the oil in the pressure chamber 17. At the same time, the rod member 19 is also moved in the opposite direction of the belt, whereby the belt will slacken and the increase of the tension is absorbed. At this time the diaphragm contracts in response to the oil amount entering into the reservoir chamber 18 and absorbs the increase of the oil volume in the reservoir chamber 18. Finally the increase of the oil volume in the reservoir chamber 18 is completely absorbed by the downward movement of the plunger 16 in the direction of the pressure chamber 17.

On the contrary, when the engine temperature falls from the high temperature to the normal temperature, the tension of the belt is decreased. Therefore, the rod member 19 is pushed upwardly by the spring 20, thereby absorbing the decrease of the belt tension. At this time the oil flows from the reservoir chamber 18 into the pressure chamber 17 through the fluid passage 26 and the check valve 27, thereby decreasing the oil amount in the reservoir chamber 18. This decrease of the oil amount will be absorbed by the expansion of the diaphragm 21. Finally the decrease of the oil volume in the reservoir chamber 18 is completely absorbed by the upward movement of the plunger 16 in the direction of the reservoir chamber 18.

From the above, according to the present invention, there is no need to install a seal member between the body 15 and the plunger 16. Even if the oil pressure in the pressure chamber 17 is increased, the sealing function is not deteriorated and the oil leak is prevented. The lower end 21a of the diaphragm 21 is hermetically fixed to the rod member 19 through the seal member 22, and the upper end 21b of the diaphragm 21 is hermetically fixed to the body 15 through the seal member 23, whereby the lower and upper ends 21a, 21b do not slide on the rod member 19. therefore, even if the rod member 19 is moved upwardly and downwardly, the sealing function of the seal members 22, 23 is not deteriorated, thereby interrupting the communication between the reservoir chamber 18 and the atmosphere by means of the diaphragm 21. Since the diaphragm 21 is made of an elastic material and is in a bellows shape, the diaphragm 21 does not touch the body 15 and the rod member 19 even if vibrations are transmitted to the diaphragm 21 and the rod member 19 is moved upwardly and downwardly, whereby the endurance of the diaphragm 21 is not deteriorated.

The terms and expressions which have been employed are used as terms of description and not of limitation, and there is no intension, in the use of such terms and expressions, of excluding any equivalents of the features shown and described, or portion thereof, it being recognized that various modifications are possible within the scope of the invention claimed.

What is new and desired to be secured by Letters Patent of the United States is:

1. A self-contained type automatic belt tensioner for automobiles comprising:
    a body having an axially extending blind bore therein with an opening at one end, a closed wall at the other end;
    a plunger slidably mounted in said blind bore of said body;
    a reservoir chamber located in said plunger;
    a pressure chamber disposed between said plunger and said closed wall of said body;
    a rod member fixed at one end thereof to said plunger and protruding at the other end thereof from said opening of said body;
    a bellows shaped elastic diaphragm located in said reservoir chamber with one end thereof being fixed to said rod member and the other end being fixed to said body;
    a fluid passage connecting said reservoir chamber and said pressure chamber with each other;
    a check valve disposed in said fluid passage so as to allow a fluid flow only from said reservoir chamber to said pressure chamber; and
    a return spring interposed between said plunger and said closed wall of said body so as to bias said plunger in the direction of said opening of said body.

2. A self-contained type automatic belt tensioner according to claim 1, wherein said one end of said diaphragm is fixed to said rod member through a seal member and said other end of said diaphragm is fixed to said body through a seal member.

3. A self-contained type automatic belt tensioner according to claim 2, wherein said both ends of said diaphragm are prevented from moving by means of a stopper member, respectively.

4. A self-contained type automatic belt tensioner according to claim 1, wherein a stopper member is secured to said body to prevent said plunger from moving in the direction of said reservoir chamber.

5. A self-contained type automatic belt tensioner according to claim 1, wherein a fluid passage is formed in said rod member.

6. A self-contained type automatic belt tensioner according to claim 1, wherein a rotation stopper member is fixed at both ends thereof to said body so as to prevent said rod member from rotating.

7. A self-contained type automatic belt tensioner according to claim 1, wherein said check valve comprises a ball member and a spring supported by a retainer.

* * * * *